United States Patent [19]

Campbell

[11] 4,212,964
[45] Jul. 15, 1980

[54] NORMALLY SOLID, MOLDABLE POLYAMIDE FROM BRANCHED CHAIN DIAMINE AND ALIPHATIC DICARBOXYLIC ACID

[75] Inventor: Robert W. Campbell, Bartlesville, Okla.

[73] Assignee: Phillips Petroleum Company, Bartlesville, Okla.

[21] Appl. No.: 635,004

[22] Filed: Nov. 25, 1975

[51] Int. Cl.$^2$ .............................................. C08G 69/26
[52] U.S. Cl. ............................... 528/340; 260/33.4 R; 260/45.75 R; 428/474; 528/324; 528/336; 528/349
[58] Field of Search .............. 260/78 R; 528/340, 349

[56] References Cited

U.S. PATENT DOCUMENTS

| | | | |
|---|---|---|---|
| 3,352,831 | 11/1967 | Schmitt et al. | 260/78 R |
| 3,575,935 | 4/1971 | Elam | 260/78 R |
| 3,776,890 | 12/1973 | Lee | 260/78 R |
| 3,980,621 | 9/1976 | Campbell | 260/78 R |

*Primary Examiner*—Harold D. Anderson

[57] ABSTRACT

Normally solid, moldable polyamides having diamine-derived structural units of the formula

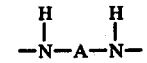

wherein each A is individually selected from the group consisting of 5-methylnonamethylene, 2,4-dimethyloctamethylene, 2,4,6-trimethylheptamethylene, and 4-isopropylheptamethylene; and diacid-derived structural units of the formula

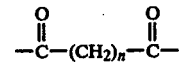

wherein each n is an integer individually selected from the group consisting of 4, 6, 8, and 10. Minor amounts of other polyamide forming materials can be included in the polyamide to provide up to 30 percent of the nitrogen atoms and up to 30 percent of the carbonyl groups. When used as adhesives, these polyamides possess good peel strength, good lap shear strength, and good boiling water resistance.

27 Claims, No Drawings

NORMALLY SOLID, MOLDABLE POLYAMIDE FROM BRANCHED CHAIN DIAMINE AND ALIPHATIC DICARBOXYLIC ACID

This invention relates to polyamides. In a specific aspect the invention relates to polyamides formed from branched $C_{10}$ diamines and straight chain aliphatic dicarboxylic acids having 6, 8, 10 and/or 12 carbon atoms.

The use of commercially available polyamides in the formulation of adhesives, for example, hot melt structural adhesives, has gained in acceptance. However, in some applications such as the sterilization of metal cans in boiling water or with steam, it is desirable that the adhesive have a greater boiling water resistance than is provided by some of the commercially available polyamides.

Accordingly, it is an object of the invention to provide a new polyamide which has good boiling water resistance. It is an object of the invention to provide a polyamide which has a good lap shear strength even after exposure to boiling water. It is also an object of the invention to provide a polyamide which has a good peel strength as well as good lap shear strength. Another object of the invention is to provide an improved polyamide adhesive. Other objects, aspects, and advantages of the invention will be apparent from a study of the specification and the appended claims to the invention.

In accordance with the present invention it has been found that the foregoing objectives can be achieved by producing a polyamide having diamine-derived primary structural units of the formula

wherein each A is individually selected from the group consisting of 5-methylnonamethylene, 2,4-dimethyloctamethylene, 2,4,6-trimethylheptamethylene, and 4-isopropylheptamethylene; and diacid-derived primary structural units of the formula

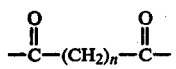

wherein each n is an integer individually selected from the group consisting of 4, 6, 8, and 10.

The A in each of the diamine-derived primary structural units can be solely 5-methylnonamethylene, 2,4-dimethyloctamethylene, 2,4,6-trimethylheptamethylene, or 4-isopropylheptamethylene, but preferably the polyamide contains a mixture of diamine-derived primary structural units wherein A in some of the units is 5-methylnonamethylene and the A in other units is 2,4-dimethyloctamethylene, with at least 20 percent, preferably at least 50 percent, more preferably at least 70 percent, and even more preferably at least 80 percent, by number, of the A's being 5-methylnonamethylene. Other isomeric diamine-derived primary structural units can be also present wherein the A in some of the units is 2,4,6-trimethylheptamethylene and/or the A in some of the units is 4-isopropylheptamethylene. In an exemplary embodiment, 20 to 96 percent, by number, of the A's are 5-methylnonamethylene, 4 to 80 percent, by number, of the A's are 2,4-dimethyloctamethylene, 0 to 25 percent, by number, of the A's are 2,4,6-trimethylheptamethylene, and 0 to 25 percent, by number, of the A's are 4-isopropylheptamethylene. In a presently preferred embodiment 70 to 96 percent, by number, of the A's are 5-methylnonamethylene, 4 to 30 percent, by number, of the A's are 2,4-dimethyloctamethylene, 0 to 15 percent, by number, of the A's are 2,4,6-trimethylheptamethylene, and 0 to 15 percent, by number, of the A's are 4-isopropylheptamethylene.

The diamine-derived primary structural units can be obtained from principal diamines having the formula $H_2N-A-NH_2$ wherein each A is individually selected from the group consisting of 5-methylnonamethylene, 2,4-dimethyloctamethylene, 2,4,6-trimethylheptamethylene, and 4-isopropylheptamethylene. The principal diamine can consist essentially of any one of 5-methyl-1,9-nonanediamine, 2,4-dimethyl-1,8-octanediamine, 2,4,6-trimethyl-1,7-heptanediamine, or 4-isopropyl-1,7-heptanediamine, or mixtures of any two or more thereof, but preferably comprises a mixture of 5-methyl-1,9-nonanediamine and 2,4-dimethyl-1,8-octanediamine, with the 5-methyl-1,9-nonanediamine constituting at least 20, preferably at least 50, more preferably at least 70, and even more preferably at least 80, mole percent of the mixture. 2,4,6-Trimethyl-1,7-heptanediamine and/or 4-isopropyl-1,7-heptanediamine can be present in the mixture. An exemplary suitable mixture for use as the principal diamine comprises 20 to 96 mole percent 5-methyl-1,9-nonanediamine, 4 to 80 mole percent 2,4-dimethyl-1,8-octanediamine, 0 to 25 mole percent 2,4,6-trimethyl-1,7-heptanediamine, and 0 to 25 mole percent 4-isopropyl-1,7-heptanediamine. A presently preferred mixture for use as the principal diamine comprises 70 to 96 mole percent 5-methyl-1,9-nonanediamine, 4 to 30 mole percent 2,4-dimethyl-1,8-octanediamine, 0 to 15 mole percent 2,4,6-trimethyl-1,7-heptanediamine, and 0 to 15 mole percent 4-isopropyl-1,7-heptanediamine.

The diacid-derived primary structural units can be obtained from the principal diacid components having the formula

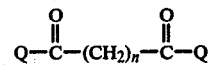

wherein each Q is individually selected from the group consisting of —OH, bromine, chlorine, alkoxy radicals having 1 to 4 carbon atoms, and phenoxy, and each n is an integer individually selected from the group consisting of 4, 6, 8, and 10. Preferably, each Q is —OH. Exemplary principal diacid components include adipic acid, suberic acid, sebacic acid, dodecanedioic acid, adipoyl chloride, adipoyl bromide, suberoyl chloride, suberoyl bromide, sebacoyl chloride, sebacoyl bromide, dodecanedioyl bromide, dodecanedioyl chloride, dimethyl adipate, dibutyl adipate, methyl ethyl adipate, dimethyl suberate, dimethyl sebacate, dimethyl dodecanedioate, diisopropyl suberate, dibutyl dodecanedioate, diphenyl dodecanedioate, and the like, and mixtures of any two or more thereof.

If desired, the polyamide can contain secondary structural units derived from other diamines, diacids, amino acids and/or lactams. In such a polyamide the nitrogen atoms provided by the diamine-derived primary structural units constitute at least 70 percent, preferably at least 80 percent, more preferably at least 90 percent, and even more preferably at least 95 percent, by number, of the total nitrogen atoms in the polyamide.

Similarly, the carbonyl groups provided by the diacid-derived primary structural units constitute at least 70 percent, preferably at least 80 percent, more preferably at least 90 percent, and even more preferably at least 95 percent, by number, of the total carbonyl groups in the polyamide.

The secondary structural units can have the formula

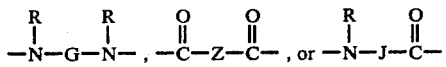

wherein each R is individually selected from the group consisting of hydrogen and alkyl radicals having from 1 to 6 carbon atoms per radical, each G is individually selected from the group consisting of divalent acyclic hydrocarbon radicals having from 6 to 16 carbon atoms, each Z is individually selected from the group consisting of divalent hydrocarbon radicals having from 5 to 12 carbon atoms, and each J is individually selected from the group consisting of divalent acyclic hydrocarbon radicals having from 5 to 13 carbon atoms. These secondary structural units can be obtained from one or more other diamines having the formula

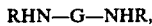
RHN—G—NHR, one or more other diacid components having the formula

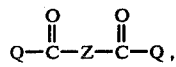

one or more amino acids having the formula

RHN—J—CO$_2$H, and/or one or more lactams having the formula

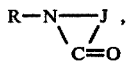

wherein R, G, Q, Z, and J are as hereinbefore defined, each Q preferably being —OH.

Thus, there can be employed in the preparation of the polyamide a minor amount of a diamine such as hexamethylenediamine, octamethylenediamine, nonamethylenediamine, decamethylenediamine, hexadecamethylenediamine, N-methylhexamethylenediamine, N,N'-dimethylhexamethylenediamine, N,N'-diethyloctamethylenediamine, N-isopropyl-N'-butyldecamethylenediamine, N,N'-dihexylhexadecamethylenediamine, and/or a minor amount of a dicarboxylic acid or derivative thereof such as pimelic acid, azelaic acid, undecanedioic acid, tridecanedioic acid, tetradecanedioic acid, 1,4-cyclohexanedicarboxylic acid, terephthalic acid, pimeloyl chloride, azelaoyl bromide, diphenyl azelate, dimethyl pimelate, diethyl azelate, undecanedioyl chloride, diisopropyl azelate, dibutyl tetradecanedioate, or dimethyl terephthalate; and/or a minor amount of an amino acid such as 6-aminohexanoic acid, 8-aminooctanoic acid, 10-aminodecanoic acid, 12-aminododecanoic acid, N-methyl-6-aminohexanoic acid, N-ethyl-7-aminoheptanoic acid, N-isopropyl-12-aminododecanoic acid, or N-hexyl-14-aminotetradecanoic acid; and/or a minor amount of a lactam such as the lactam of any of the above-named amino acids. When present, the secondary structural units will generally provide from 0.01 to 30 percent, preferably from 1 to 25 percent, by number, of the nitrogen atoms and/or from 0.01 to 30 percent, preferably from 1 to 25 percent, by number, of the carbonyl groups in the polyamide.

The diamine(s) and the diacid component(s) can be individually introduced into the polycondensation reaction zone and therein be subjected to suitable polycondensation reaction conditions. Alternatively, at least a portion of the diamine(s) can be reacted with at least a portion of the dicarboxylic acid(s) to form the corresponding salt(s). The preformed salt(s), together with any additional amounts of diamine(s) and/or dicarboxylic acid(s), can be introduced into the polycondensation reactor and therein be subjected to suitable polycondensation reaction conditions. In the polycondensation reaction zone, the molar ratio of the total diamine(s) to the total diacid component(s) will generally be substantially 1:1, although a slight excess, e.g., up to 5 mole percent, of the diamine(s) or the diacid component(s) can be used.

The polyamides of this invention can be prepared under any suitable polycondensation conditions. In general, in a preferred procedure in which the diacid components are employed as dicarboxylic acids, the mixture of monomers and/or salts thereof can be heated at temperatures in the range of about 200° to about 340° C., preferably in the range of about 260° to about 320° C., for a period of time in the range of about 1 hour to about 24 hours, preferably in the range of about 1.5 hours to about 8 hours. The pressure normally reaches a maximum of not more than about 1,000 psig, preferably not more than about 600 psig, and is allowed to diminish by venting gaseous material, sometimes with the aid of an inert gas, the final heating being conducted at a pressure at low as about 1 mm Hg, preferably in the range of about 10 to about 50 mm Hg. If desired, the mixtures of monomers and/or salts can be heated at a lower temperature, e.g., in the range of about 200° to about 230° C., for a period of time, e.g., in the range of about ½ hour to about 16 hours, prior to the heating to a temperature in the range of about 260° to about 320° C. Water can be present to serve as a heat transfer agent and to aid in keeping the reactants in the reaction zone. Acetic acid can be present, if desired, in an amount up to about 2 mole percent based on the total diacid, to control and stabilize the molecular weight of the polyamide. A thermoxidative stabilizer such as manganese lactate can be employed, if desired.

When diacid components other than dicarboxylic acids are employed, reaction conditions known in the art for use with such diacid components, sometimes differing from those described above, can be used in the production of the polyamides of this invention.

The polyamides of this invention can be employed as molding resins, as hot melt adhesives, or in the production of coatings or films. In general the polyamides of this invention will have an inherent viscosity (as measured at 30° C. in a m-cresol solution having a polymer concentration of 0.5 gram/100 milliliters solution) of at least 0.4, preferably in the range of 0.6 to 2. In general, when used as hot melt adhesives, the polyamides of this invention will have a "T"-peel strength (determined as shown in Table I and footnotes thereto) for aluminum-to-aluminum bonding of at least 3 pounds per inch width, preferably of at least 4 pounds per inch width, and more preferably of at least 5 pounds per inch width; a lap shear strength (ASTM D 1002-72) for aluminum-to-aluminum bonding of at least 1000, preferably at least 1200, and more preferably at least 1500 pounds per square inch of shear area; and a percentage retention of lap shear strength at 25° C. after exposure to boiling water for 24 hours of at least 50 percent, preferably at least 60 percent, and more preferably at least 70 percent.

The polyamides of this invention can be blended with various additives such as fillers, pigments, stabilizers, softeners, extenders, or other polymers. For example, there can be incorporated in the polymers of this invention substances such as graphite, carbon black, titanium dioxide, glass fibers, carbon fibers, metal powders, magnesia, silica, asbestos, wollastonite, clays, wood flour, cotton floc, alpha cellulose, mica, and the like. If desired, such additives can be added to the polymerization reactor.

within the range of 280° to 300° C. during a period of ½ to 1 hour, and heated substantially at 280° to 300° C. for ½ to 1 hour, all the while venting as necessary to maintain the pressure at 400 to 500 psig, after this pressure was attained. Unless otherwise indicated, the autoclave was then heated substantially at 280° to 300° C., first for ½ hour while venting to 0 psig, then for ½ hour under a flow of nitrogen at substantially atmospheric pressure, then for ¼ to ½ hour while reducing the pressure to about 20 to about 25 mm Hg, and finally for ½ to 1 hour at about 20 to about 25 mm Hg. The resulting polyamide was removed from the autoclave, and properties thereof were determined. These properties are shown in Table I. Flexural modulus, tensile strength, and elongation were determined on samples compression molded at 218° C., except in runs 2 and 5, as noted in Table I. Also shown in Table I are properties of Milvex 1235 polyamide, listed therein as "control".

TABLE I

| Run | Polymer[a] | Tm °C.[b] | Inh. Vis.[c] | Lap Shear Strength, psi at 25°C.[d] | | | | "T"-Peel Strength, ppiw[e] | | F.M., psi × 10⁻³[f] | Elong., %[g] | T.S., psi[h] |
|---|---|---|---|---|---|---|---|---|---|---|---|---|
| | | | | 1 Day | 14 Days | Before Boiling | After Boiling | % Retention | 1 Day | 14 Days | | | |
| 1 | Control | 192 | 1.07 | 1480[i] | 1160[i] | 1900[j] | 1150[j] | 60.5 | 1.9[i,k] | 1.6[i] | — | — | — |
| 2 | MND,6[l] | 182 | 1.2 | 1670[m] | 1490[m] | 2210[n] | 1600[n] | 72.4 | 5.2[n] | — | 182 | 675 | 8630 |
| 3 | MND,7 | 127 | 1.4 | 2030[m] | 1760[m] | 1700[o] | 270[o] | 15.9 | 20.4[m] | 6.8[m] | 117 | 887 | 1780 |
| 4 | MND,8 | 168 | 1.65 | 2160[p] | 1820[p] | 1750[o] | 2140[o] | 122.3 | 5.0[p] | 4.9[p] | 170 | 277 | 4860 |
| 5 | MND,9[q] | 132 | 1.1 | 800[r] | 1330[r] | 880[s] | 190[s] | 21.6 | 2.6[s] | — | 74 | 1005 | 7810 |
| 6 | MND,10 | 158 | 1.3 | 2280[t] | 2070[t] | 1910[u] | 2240[u] | 117.3 | 7.3[t] | 6.1[t] | 150 | 430 | 6450 |
| 7 | MND,12 | 157 | 1.3 | 2210[t] | 2110[t] | 1610[u] | 1430[u] | 88.8 | 7.5[t] | 7.4[t] | 182 | 300 | 5310 |

[a] The first symbol indicates the diamine and the second symbol indicates the diacid employed to produce the polymer. The 6 diamine is hexamethylenediamine, and MND is a mixture of diamines comprising primarily 5-methyl-1,9-nonanediamine, described more fully below where the charge is shown for each run. The 6, 7, 8, 9, 10 and 12 diacids are adipic acid, pimelic acid, suberic acid, azelaic acid, sebacic acid and dodecanedioic acid, respectively.
[b] Determined by differential thermal analysis on premelted and quenched samples except in run 3, in which the determination was made on a stretched sample which was not premelted and quenched.
[c] Determined at 30° C. on a m-cresol solution having a polymer concentration of 0.5g/100 ml solution. (Inherent Viscosity).
[d] Lap shear strength was determined by the method of ASTM D 1002-72 for aluminum-to-aluminum bonding, the aluminum coupons previously having been washed with toluene and with acetone, dried, and then grit blasted. The aluminum coupons used were in the form of strips 4.0 inches × 1.0 inch × 0.065 inch, with an overlap of 0.5 inch. The bonding was conducted at a pressure of 25–35 psi for about 30 minutes. The thickness of the adhesive layer in the test specimens was within the range of 1 to 10 mils. The lap shear strength values shown in the columns headed "1 Day" and "14 Days" were determined after the bonded test specimens had aged at about 25° C. for 1 day and for 14 days, respectively. In two additional series of tests, the lap shear strength values shown in the column headed "Before Boiling" were determined in runs 1, 2, and 5 after the bonded test specimens had aged at about 25° C. for 1 day and in runs 3, 4, 6, and 7 after the bonded test specimens had aged at about 25° C. for 10 days. The values shown in the column headed "After Boiling" were determined on additional bonded test specimens, comparable in preparation and aging to those for which respective lap shear strength values are shown in the "Before Boiling" column, these additional bonded test specimens then having been immersed in boiling water at about 100° C. for 24 (e) hours prior to lap shear strength determination. The values shown in the column headed "% Retention" determined by dividing the values shown in the column headed "After Boiling" by the respective values shown in the column headed "Before Boiling" and multiplying by 100, represent the extent to which lap shear strength is retained after being subjected to the boiling water treatment.
[e] "T"-Peel strength was determined at 25° C. by placing a film of the polymer between 5-mil aluminum sheets, previously washed with toluene and with acetone and then grit blasted, and then pressing at 5 tons ram force for 15 minutes to provide an adhesive layer 1–10 mils thick which bonds the aluminum sheets, followed by cutting the bonded sheets into strips 1 inch wide and pulling on an Instron test machine at a rate of 20 inches per minute, and then allowing to age at about 25° C. for 1 day or for 14 days.
[f] ASTM D 790-66. Flexural Modulus.
[g] Elongation ASTM D 638-68.
[h] Tensile Strength. ASTM D 638-68. Values for tensile strength at break except in run 3, in which value is for tensile strength at yield.
[i] Bonding temperature was 300°–310° C.
[j] Bonding temperature was 250°–270° C.
[k] In other testing, with a bonding temperature of 250°–270° C., value was 2.8.
[l] Properties of molded specimens were determined on samples injection molded at 230° C.
[m] Bonding temperature was 240°–250° C.
[n] Bonding temperature was 190°–200° C.
[o] Bonding temperature was 230°–235° C.
[p] Bonding temperature was 230°–240° C.
[q] Properties of molded specimens were determined on samples injection molded at 190° C.
[r] Bonding temperature was 160°–170° C.
[s] Bonding temperature was 115°–125° C.
[t] Bonding temperature was 220°–230° C.
[u] Bonding temperature was 224°–230° C.

The following data are presented in further illustration of the invention, but should not be construed in undue limitation thereof.

EXAMPLE I

In each of a series of runs a mixture of the isomeric diamine, the diacid, and distilled water were charged to a stirred autoclave. The autoclave was alternately pressured with nitrogen and evacuated several times, then sealed under a pressure of 40–60 psig nitrogen. The autoclave was then heated from about 25° C. to 210° C. during about ½ hour, maintained substantially at 210° C. for 1–2½ hours, heated from 210° to a temperature In run 1 properties were determined on Milvex 1235 polyamide, a commercial aliphatic polyamide hot melt adhesive.

In run 2 the charge was 2314.64 g (13.433 moles) of a mixture of isomeric diamines consisting of 89.8 mole percent 5-methyl-1,9-nonanediamine, 9.8 mole percent 2,4-dimethyl-1,8-octanediamine, 0.1 mole percent 2,4,6-trimethyl-1,7-heptanediamine, and 0.3 mole percent 4-isopropyl-1,7-heptanediamine; 1943.66 g (13.3 moles) of adipic acid; 0.1984 g manganese lactate; and 1064.58 g water.

In run 3 the charge was 86.16 g (0.5 mole) of a mixture of isomeric diamines consisting of 89.6 mole percent 5-methyl-1,9-nonanediamine, 10.0 mole percent 2,4-dimethyl-1,8-octanediamine, 0.1 mole percent 2,4,6-trimethyl-1,7-heptanediamine, and 0.3 mole percent 4-isopropyl-1,7-heptanediamine; 80.09 g (0.5 mole) pimelic acid; 0.005 g manganese lactate; and 42 g water.

In run 4 the charge was 86.16 g (0.5 mole) of the same mixture of isomeric diamines shown for run 3; 87.09 g (0.5 mole) suberic acid; 0.005 g manganese lactate; and 44 g water.

In run 5 the charge was 1202.72 g (6.98 moles) of the same mixture of isomeric diamines shown for run 2; 1313.77 g (6.98 moles azelaic acid; 0.1189 g manganese lactate; and 629.12 g water. The final pressure used in the polymerization was about 75 mm Hg.

In run 6 the charge was 86.16 g (0.5 mole) of the same mixture of isomeric diamines shown for run 3; 101.13 g (0.5 mole) sebacic acid; 0.005 g manganese lactate; and 46.8 g water.

In run 7 the charge was 86.16 g (0.5 mole) of the same mixture of isomeric diamines shown for run 3; 115.15 g (0.5 mole) dodecanedioic acid; 0.005 g manganese lactate; and 50.32 g water.

A comparison of the polyamides of the present invention (runs 2, 4, 6, and 7) with the commercial hot melt adhesive (run 1) demonstrates that the polyamides of the present invention have substantially better "T"-peel strength values than the control as well as retaining substantially greater percentage of their lap shear strength after 24 hours exposure to boiling water than the control. A comparison of the polyamides of runs 2, 4, 6, and 7 with the polyamides employing diacid with an odd number of carbon atoms (runs 3 and 5) demonstrates that the polyamides of the present invention are much more resistant to hot water, as indicated by the values for percentage retention of lap shear strength, than the polyamides of diacids having an odd number of carbon atoms. The values for tensile strength, elongation, and flexural modulus shown for the polyamides of the present invention illustrate the utility of these polyamides as molding resins.

Reasonable variations and modifications are possible within the scope of the foregoing disclosure and the appended claims to the invention.

That which is claimed is:

1. A normally solid, moldable polyamide comprising: diamine-derived primary structural units of the formula

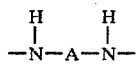

wherein each A is individually selected from the group consisting of 5-methylnonamethylene, 2,4-dimethyloctamethylene, 2,4,6-trimethylheptamethylene, and 4-isopropylheptamethylene; and diacid-derived primary structural units of the formula

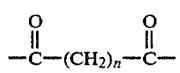

wherein each n is an integer and is 4, 6, 8, or 10; the nitrogen atoms provided by said diamine-derived primary structural units constituting at least 70 percent, by number, of the total nitrogen atoms in said polyamide; the carbonyl groups provided by said diacid-derived structural units constituting at least 70 percent, by number, of the total carbonyl groups in said polyamide; the balance, if any, of the nitrogen atoms and carbonyl groups in said polyamide being provided by secondary structural units selected from the group consisting of

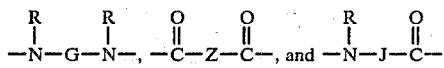

wherein each R is individually selected from the group consisting of hydrogen and alkyl radicals having from 1 to 6 carbon atoms per radical, each G is a divalent acyclic hydrocarbon radical having 6 to 16 carbon atoms, each Z is a divalent hydrocarbon radical having from 5 to 12 carbon atoms and each J is a divalent acyclic hydrocarbon radical having from 5 to 13 carbon atoms.

2. A polyamide in accordance with claim 1 wherein at least 80 percent, by number, of the nitrogen atoms in said polyamide are provided by said diamine-derived primary structural units, and at least 80 percent, by number, of the carbonyl groups in said polyamide are provided by said diacid-derived primary structural units.

3. A polyamide in accordance with claim 2 wherein at least 90 percent, by number, of the nitrogen atoms in said polyamide are provided by said diamine-derived primary structural units, and at least 90 percent, by number, of the carbonyl groups in said polyamide are provided by said diacid-derived primary structural units.

4. A polyamide in accordance with claim 3 wherein said polyamide is a linear polymer consisting essentially of said diamine-derived primary structural units and said diacid-derived primary structural units.

5. A polyamide in accordance with claim 4 wherein the A in at least 50 percent, by number, of said diamine-derived primary structural units is 5-methylnonamethylene and the A in each of the balance, if any, of said diamine-derived primary structural units in individually selected from the group consisting of 2,4-dimethyloctamethylene, 2,4,6-trimethylheptamethylene, and 4-isopropylheptamethylene.

6. A polyamide in accordance with claim 4 wherein each n is 4.

7. A polyamide in accordance with claim 4 wherein each n is 6.

8. A polyamide in accordance with claim 4 wherein each n is 8.

9. A polyamide in accordance with claim 4 wherein each n is 10.

10. A polyamide in accordance with claim 1 wherein the A in at least 50 percent, by number, of said diamine-derived primary structural units is 5-methylnonamethylene and the A in each of the balance, if any, of said diamine-derived primary structural units is individually selected from the group consisting of 2,4-dimethyloctamethylene, 2,4,6-trimethylheptamethylene, and 4-isopropylheptamethylene.

11. A polyamide in accordance with claim 10 wherein each n is 4.

12. A polyamide in accordance with claim 10 wherein each n is 6.

13. A polyamide in accordance with claim 10 wherein each n is 8.

14. A polyamide in accordance with claim 10 wherein each n is 10.

15. A polyamide in accordance with claim 1 having a percentage retention of lap shear strength at 25° C., as determined by the method of ASTM D 1002-72 after exposure to boiling water for 24 hours of at least 50 percent for aluminum-to-aluminum bonding with said polyamide.

16. A polyamide in accordance with claim 15 having a lap shear strength at 25° C., as determined by the method of ASTM D 1002-72 of at least 1000 pounds per square inch.

17. A polyamide in accordance with claim 1 having a percentage retention of lap shear strength at 25° C., as determined by the method of ASTM D 1002-72 after exposure to boiling water for 24 hours of at least 50 percent for aluminum-to-aluminum bonding with said polyamide, a lap shear strength value, as determined by the method of ASTM D 1002-72 for aluminum-to-aluminum bonding, of at least 1200 pounds per square inch, and a "T"-peel strength of at least 5 pounds per inch width.

18. A polyamide in accordance with claim 17 wherein the A in at least 70 percent, by number, of said diamine-derived primary structural units is 5-methyl-nonamethylene and the A in each of the balance, if any, of said diamine-derived primary structural units is individually selected from the group consisting of 2,4-dimethyloctamethylene, 2,4,6-trimethylheptamethylene, and 4-isopropylheptamethylene.

19. A polyamide in accordance with claim 18 wherein each n is 4.

20. A polyamide in accordance with claim 18 wherein each n is 6.

21. A polyamide in accordance with claim 18 wherein each n is 8.

22. A polyamide in accordance with claim 18 wherein each n is 10.

23. A polyamide in accordance with claim 15 wherein the A in at least 70 percent, by number, of said diamine-derived primary structural units is 5-methyl-nonamethylene and the A in each of the balance, if any, of said diamine-derived primary structural units is individually selected from the group consisting of 2,4-dimethyloctamethylene, 2,4,6-trimethylheptamethylene, and 4-isopropylheptamethylene.

24. A polyamide in accordance with claim 23 wherein each n is 4.

25. A polyamide in accordance with claim 23 wherein each n is 6.

26. A polyamide in accordance with claim 23 wherein each n is 8.

27. A polyamide in accordance with claim 23 wherein each n is 10.

* * * * *